INVENTORS:
ROBERT J. WAGNER
LUTHER P. MANSHIP
BY Howson & Howson
ATTYS.

July 23, 1968  R. J. WAGNER ET AL  3,393,900
FOOD MIXER
Original Filed Oct. 21, 1965
3 Sheets-Sheet 3
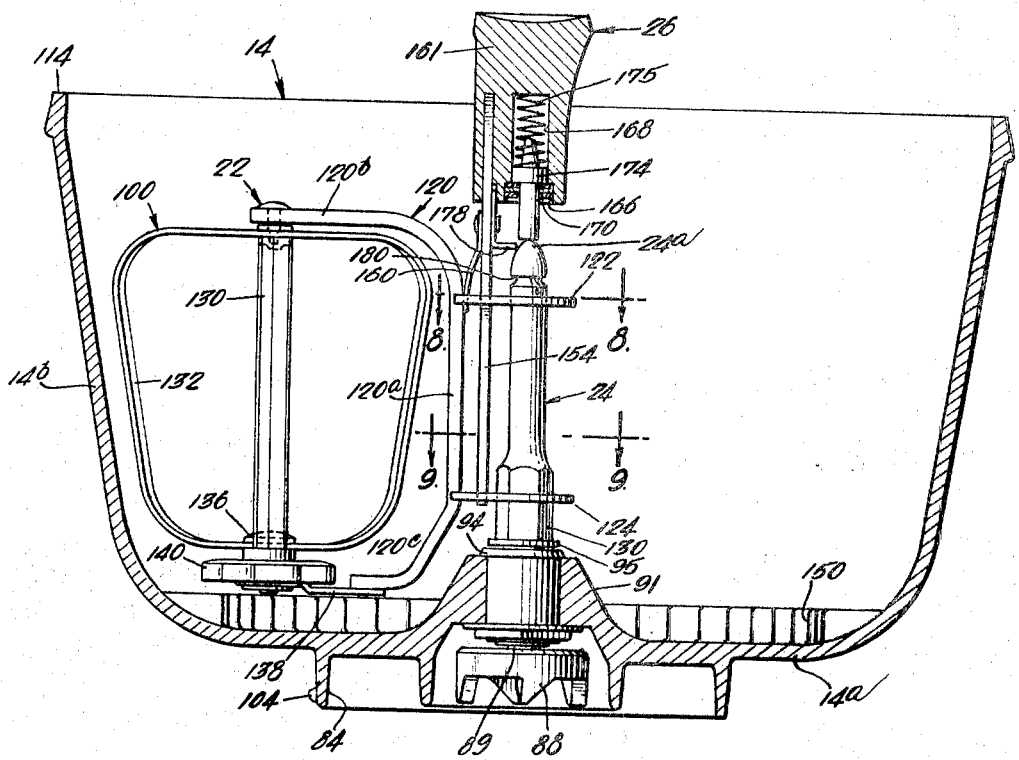
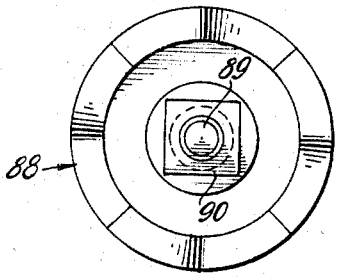
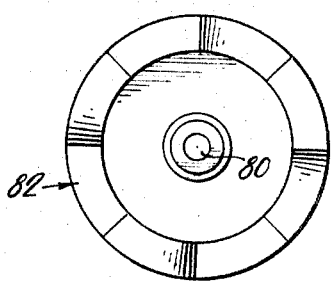
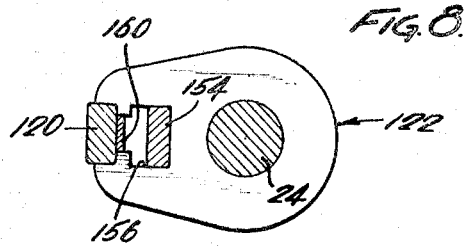
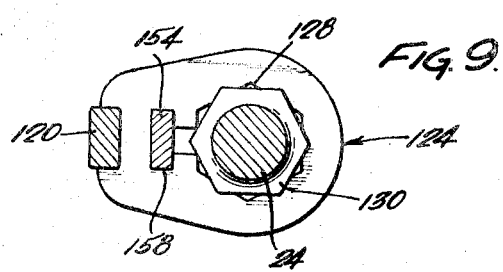
INVENTORS:
ROBERT J. WAGNER
LUTHER P. MANSHIP
BY Howson & Howson
ATTYS.

United States Patent Office 3,393,900
Patented July 23, 1968

3,393,900
FOOD MIXER
Robert J. Wagner, Meadowbrook, and Luther P. Manship, Collingdale, Pa., assignors to Proctor-Silex Incorporated, Philadelphia, Pa., a corporation of New York
Continuation of application Ser. No. 499,886, Oct. 21, 1965. This application Apr. 17, 1967, Ser. No. 631,562
45 Claims. (Cl. 259—111)

ABSTRACT OF THE DISCLOSURE

A food mixer including a structure having a bottom joined to upwardly extending sidewalls defining a container, gear means within and fixed to the container adjacent the bottom of the container, and beater means within the container and having means engageable with the gear means to cause a predetermined pattern of movement of the beater means. Means is provided for coupling the beater means and the container and holding the beater means within the container alternatively in a position to cooperate with the gear means to cause mixing of ingredients therebetween or in a position disengaged from the gear means. A support base is provided having a top and bottom and having seating means for supporting the container. Drive means is employed in the base adapted to be coupled to the beater means in the container. Means is provided for interconnection of the container and base members including engagement means supported by one of the members and cooperating engagement means supported by the other of the members for being engaged to limit rotation of the container and to hold the container on the base.

---

This application is a continuation of our application Ser. No. 499,886, filed Oct. 21, 1965, now abandoned.

The present invention relates to a food mixer, and more particularly, to an improved food mixer suitable for use in the home to provide thorough and rapid mixing of food ingredients.

There are many applications in which it is desirable to provide a food mixer which is capable of beating and mixing food ingredients, and one which provides a quick and complete mixing action for uniform blending as required in home food preparation. It is desirable to provide such a food mixer which is compact and light in weight for ease of handling, as well as one which is efficient in operation. It is also desirable to provide such a food mixer which is not unsightly or cumbersome for storage on an open counter or in a cabinet and one which preferably provides a completely closed mixing bowl to protect its interior and any contents therein against dust and dirt. It is also desirable to provide such a food mixer which does not require manual scraping of the bowl or holding thereof during the mixing operation.

In the prior art a few food mixers have been designed employing a planetary motion of beater blades driven around a mixing bowl. These prior art food mixers have been generally of two types: first, mixers in which the beater blades are driven from apparatus located above the mixing bowl, and, second, mixers in which the beater blades are driven from gears supported on and operated by a driving shaft within a center post supported in the mixing bowl. The first type of prior art mixer has many undesirable features such as the top of the mixing bowl is not completely open for easy access to add ingredients, and since the beater blade assembly is located over the bowl, it must be removed before the bowl can be moved for pouring out of ingredients, thereby threatening dripping of the ingredients from the beater blade assembly on undesired areas. The second type of prior art mixer also has many undesirable features in that the center post assembly supported in the bowl is bulky and the assembly is not easily cleaned after use. In addition, both types of mixers have not been capable of mixing small quantities of ingredients and have not provided a thorough and even mixing action over all areas in the mixing bowl. Further, lubricants for the gears driving the beater blade assembly may find their way into the ingredients being mixed. Also, the mixing bowls have not been easily and quickly seated on and removable from the base on which they are supported, nor have the beater blade assemblies been easily and quickly capable of being assembled for mixing or disassembled for cleaning.

Accordingly, it is an object of the present invention to provide a food mixer suitable for household use in mixing food ingredients.

Another object is to provide an improved food mixer in which the mixing operation is performed without the necessity for the user to scrape the mixing bowl, spin the bowl, or in any way assist in the mixing operation.

A further object is to provide a food mixer that permits rapid, easy and accurate placement of the mixing bowl on the support base and drive unit, and to provide an automatic locking arrangement of the bowl to the base when the mixing action commences.

It is also an object to provide such a food mixed which is capable of producing two types of mixing action, one a gentle stirring or folding of ingredients and the other a thorough beating action thereof.

Still another object is to provide a new and improved mixing bowl in which the shape and configuration of the beater blade assembly together with its planetary rotation in the bowl through cooperation with a rotatable center post assures contact by the blade assembly to produce complete and thorough mixing of all ingredients in the mixing bowl.

Still another object is to provide a mixing bowl which has its entire top portion capable of being open during the mixing operation for ease of access in adding ingredients and one in which the beater blade assembly may be held fixed in position within the bowl while the ingredients are poured from the bowl.

It is a still further object to provide a mixing bowl which is capable of thoroughly mixing small quantities of ingredients placed in the mixing bowl.

In accordance with the present invention, these and other objects are achieved by providing a mixing bowl which has a center post rotatably supported in the bottom thereof and which has a beater frame coupled to the center post and adapted to be driven in a planetary manner thereabout. Beater blade means is rotatably supported by the beater frame and revolves with the beater frame around the center post. Actuator means is provided by the bowl and is adapted for causing rotation of the beater blade means which cooperates therewith. Preferably, the actuator means provided by the bowl is a ring gear formed integrally with the bottom of the bowl. The beater blade means is provided with a pinion gear which is adapted to mesh with the ring gear to impart rotational movement to the beater blades along the axis of pinion gear rotation as the pinion gear is driven around the ring gear by rotation of the beater frame with the rotatable center post. By this arrangement of beater frame and beater blade means with the pinion gear and ring gear adjacent the bottom of the bowl, an effective and thorough mixing of small quantities of ingredients in the bottom of the bowl may be accomplished. The configuration and shape of the beater blade means is such as to provide contact with all of the ingredients between the center post and sidewalls of the bowl, and hence complete mixing action as the beater assembly is driven in a planetary manner around the driving center post.

In the preferred form of the food mixer of the present invention, a releasable latch mechanism is employed with the beater frame to hold the frame relative to the center post alternatively in a first position wherein the pinion gear of the beater blade means is rotated about the center post free of the ring gear, providing a gentle mixing action, and in a second position wherein the pinion gear meshes with the ring gear to rotate the pinion gear and beater blades about an axis between the center post and the sidewalls of the bowl, providing a mixing action which produces thorough beating of ingredients. Preferably, the mixing bowl is supported by a support base having a top and bottom and having a collar portion at the top thereof. The bowl is preferably provided with a mating collar portion extending downwardly from the bottom of the bowl to cooperate with the collar portion of the base to lock the bowl against axial rotation relative to the base. Drive means is located within the support base and provides a driving member connectable through an opening within the collar portion of the base, the driving member being coupled to the center post for imparting rotation thereto.

Preferably, the collar portion of the base and the collar portion of the bowl have means for providing locking engagement between the bowl and the base so that the bowl is held fixedly on the base when the mixer is operating.

For a better understanding of these and other features and advantages of the present invention, reference is made to the following detailed description and accompanying drawings, in which:

FIG. 5 is a sectional view of the mixing bowl similar to FIG. 1 showing the beater frame in its initial position upon being coupled to the center post in the mixing bowl;

FIG. 6 is an inverted plan view of the coupling member secured to the center post of the mixing bowl;

FIG 7 is a plan view of the driving coupling member secured to the drive shaft located in the support base;

FIG. 8 is a sectional view taken along line 8—8 of FIG. 5; and

FIG. 9 is a sectional view taken along the line 9—9 of FIG. 5.

Figure 1:
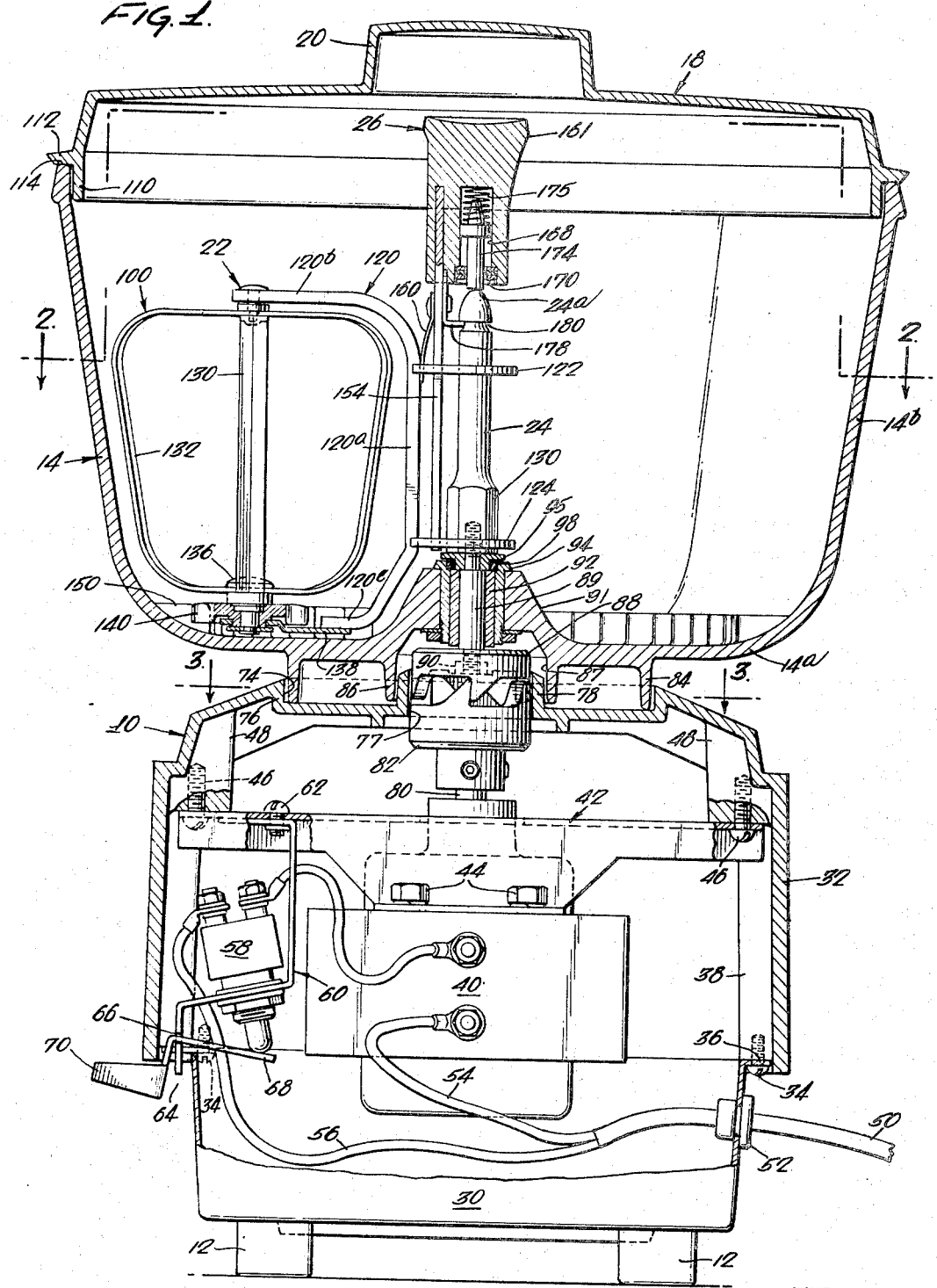
FIG. 1 is a side elevational view, partially in section of the food mixer of the present invention.

Referring now to the embodiment of the invention illustrated in FIG. 1, the food mixer comprises a hollow base, generally designated 10, preferably supported on feet 12 of rubber secured to the bottom corners of base 10. Rubber feet are employed to damp out vibrations from the base, protect the surface on which the base is placed and deter lateral movement of the base. Mixing bowl 14, preferably constructed of a molded resinous material, has a mating portion nested within a noncircular collar atop base 10. The mixing bowl 14 is provided with lid 18, preferably of transparent resinous material, surmounted by an integral knob 20. The lid 18 has an annular lip flange which nests within the lip of the bowl and completely closes the bowl opening. Supported within the bowl is a beater assembly, generally designated 22, which is driven in a planetary manner by a rotatable center post 24 about its own axis. The support structure for the beater assembly is releasably coupled to the center post 24 by structure including latch means, generally designated 26.

The base 10 is composed of a two-piece unit comprising a lower generally square box 30 of metal having sidewalls bowed outwardly from the corners and an upper inverted box 32 of similar shape and slightly larger cross-section than the lower portion preferably composed of molded resinous material. The two portions of the base are secured together by screws 34 extending through outwardly extending flanges 36 of lower portion 30 into vertically extending ribs 38 formed integrally with sidewalls of upper portion 32.

An alternating current motor, generally designated 40, schematically shown in FIG. 1, is mounted in the base 10 by means of screws 44 onto flanges symmetrically extending to both sides from a cross tie bracket 42 which extends across the portion 32 and is fixed thereto by screws 46 threaded into vertically extending ribs 48.

An electric cord 50 for supplying power to the motor is brought into the base portion 30 through an opening in the sidewall having an insulating fitting 52. One conductor 54 of the cord is connected directly to a terminal of the motor and the other conductor 56 is connected to the other motor terminal through a conventional pushbutton on-off switch 58. Switch 58 is supported on an intermediate portion of a bracket 60 mounted at one end to cross tie bracket 42 by screws 62. The other end of bracket 60 terminates in a portion 64 extending downwardly through an opening between the upper and lower portions of the base and has a narrowed portion adapted to fit in a slot 66 in an arm of switch actuator crank 68, which extends into the housing into contact with the plunger of switch 58. The other end of crank 68 projects through the opening between the base portions and is joined to a generally horizontally extending finger piece 70. Downward pressure on the finger piece 70 rotates crank 68 about its pivot point provided by support bracket 60 to move the switch plunger and change its state to energize or deenergize motor 40. By this arrangement of downward movement of finger piece 70, the operator can easily start or stop the mixer with the use of the bottom or back of the hand or elbow as easily as with a finger. The parts of the base and and their operation are described in detail in our application entitled "Power Base Unit," Ser. No. 504,804, filed Oct. 24, 1965, now abandoned.

Figure 2:
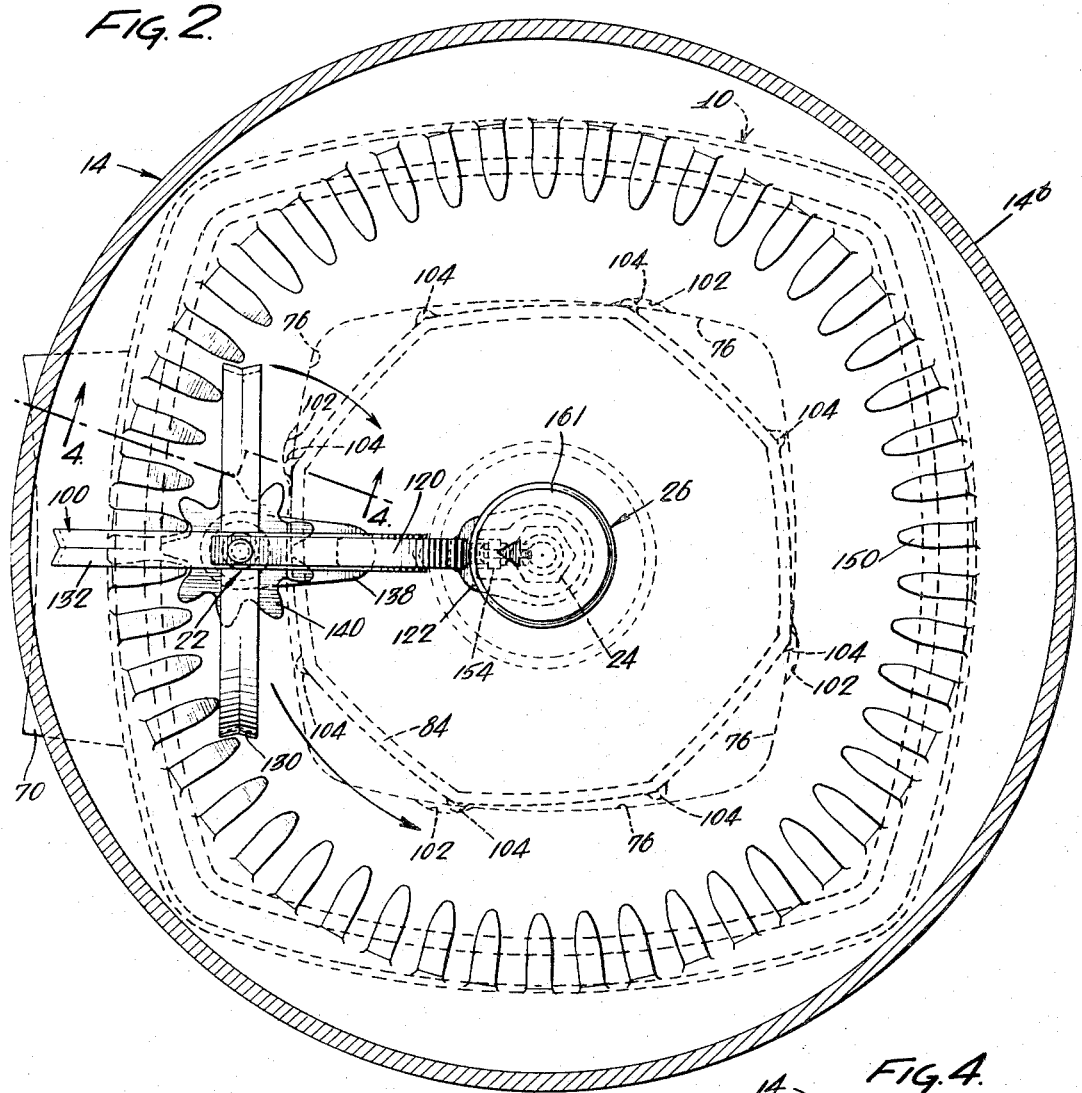
FIG. 2 is an enlarged sectional view taken along the line 2—2 of FIG. 1.
Figure 3:
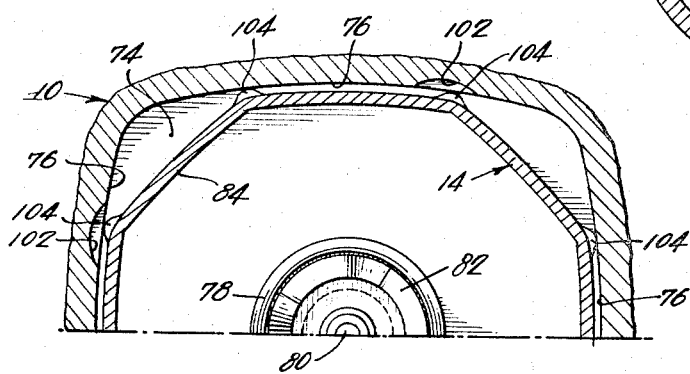
FIG. 3 is a fragmentary sectional view showing the mixing bowl in the position assumed when initially placed on the support base taken along the line 3—3 of FIG. 1.

The top surface of upper portion 32 of base 10 has incorporated therein a shallow well 74, having upwardly extending sidewalls 76, generally square in configuration, and having a centrally located circular opening 77 in the bottom of the well bounded by a vertically upwardly extending rim 78, as shown in FIGS. 1, 2 and 3. Motor 40 has a vertically upwardly extending drive shaft 80 terminating in a coupling member 82, shown in plan view in FIG. 7, which is pinned to shaft 80 and rotates within the circular opening 77 bounded by rim 78. Sidewalls 76 of well 74 and rim 78 serve to retain and guide cooperating portions of the mixing bowl 14 into a firm bowl supporting position on the base 10. To facilitate seating of the bowl on the base, the bottom 14a of the bowl is provided with a downwardly extending collar 84 generally octagonal in form centered on the axis of symmetry of the bowl and fitting within the well 74 adjacent to and in locking relation with sidewalls 76. A circular collar 86 extending downwardly from the bottom of the bowl is provided within and concentric with collar 84 around a bore 87 centrally located in bottom 14a. Collar 86 encircles rim 78 to guide alignment in seating the bowl on the base. Clearance is provided between the sidewalls 76 and collar 84 and rims 78 and 86, respectively, to facilitate alignment and engagement of the respective bowl and base parts. When the bowl is placed on the base, a slight rotation of the bowl about its central axis will align the octagonal-shaped collar with the sidewalls of the well so that the bowl will drop into its seated position on the base.

The bowl is provided with a shaft 89 centrally located in the bowl and extending beneath the bowl through a boss 91 and projecting upwardly into the bowl. The shaft is driven by a coupling member 88, shown in inverted plan view in FIG. 6, for mating with coupling member 82. Coupling member 88 is fixed to shaft 89 as by nut 90 threaded on the end of shaft 89 beneath the bowl within recess 87 defined by the bottom of boss 91 and rim 86. Shaft 89 rotates within an inner bearing sleeve 92, which is press fitted within an outer bearing sleeve 94. Outer bearing sleeve 94 is secured within the boss by shoulders provided respectively by a radial flange abutting the top of the boss and a nut received by the threaded end of the sleeve. Shaft 89 terminates at its upper end in a reduced diameter threaded axial shank extending within the bowl. Snugly surrounding the shank is annular seal element 95 which is held in place between shaft 89 and center post 24 by the engagement of the threaded end of the shank within an internally threaded bore in the lower end of center post 24. The seal element 95 which mechanically forms a unitary structure with shaft 89 and post 24 has a radially outwardly extending flange above a reduced diameter portion, the flange being above, so as not to abut against, the upper surface of outer sleeve 94. An annular cavity is created between said element 95, outer sleeve 94 having an enlarged diameter opening and the upper end of inner sleeve 92. A resilient O-ring 98 is positioned within the cavity in contact with the seal element and outer sleeve. By this arrangement, the opening in boss 91 is sealed by outer sleeve 94, resilient O-ring 98, seal element 95 and the lower end of center post 24, thus preventing any ingredients in the bowl from leaking through opening in the bottom thereof.

Figure 4:
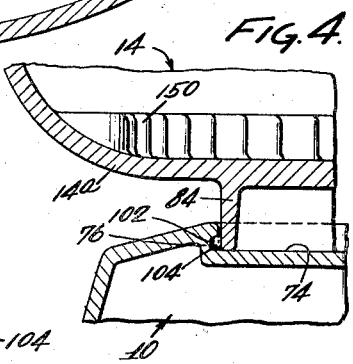
FIG. 4 is a fragmentary sectional view taken along the line 4—4 of FIG. 2.

When the motor is energized, coupling member 82 on the motor drive shaft engages mating coupling member 88 thereby causing rotation of shaft 89 and center post 24 connected thereto. Rotation of center post 24 provides the drive for the beater assembly 22 which the center post supports. As the center post 24 and the beater assembly 22 are rotated in a counterclockwise direction by the motor drive, as viewed from above the bowl in FIG. 2, the counterclockwise rotary movement in conjunction with clockwise rotation of beater blades 100 in the beater apparatus has a tendency to rotate bowl 14 in a counterclockwise direction from the position shown in FIG. 3, for reasons which will be explained hereafter, until alternate corners of the octagonal-shaped collar 84 engage and lock against sidewalls 76 of well 74 as seen in FIGS. 2 and 4. Locking engagement is provided by undercut grooves 102 located adjacent the bottom of well 74 in each of the four sidewalls 76 in position and of a size to receive projections 104 at the corners of octagonal-shaped collar 84 when the corners are driven against the sidewall. If the user does not rotate the bowl into locking engagement with the base, the first force of rotation of the bowl caused by the beater blades will immediately move the bowl into locking engagement with the base. Thus, the bowl is retained in a fixed position, thereby freeing the user's hands from holding the bowl in the required position for mixing. Additionally, the bowl is locked in position relative to the base and cannot be jarred or worked loose under load and will remain fixed until the load is removed so that there is no danger of the bowl falling off the base.

The general shape of the bowl 14 and lid 18 are shown in FIGS. 1 and 2. As can be seen more clearly in FIG. 1, the lid which preferably is made of rigid non-breakable transparent material has a lip 110 extending downwardly into the bowl adjacent the sidewalls thereof and a radially outwardly extending support flange 112 which rests atop edge 114 of the mixing bowl to completely close the bowl. The integral knob 20 which surmounts the lid in addition to providing a means for manually removing the lid, is hollow and provides a recess into which the latch means 26, which projects above bowl at the center thereof in the position shown in FIG. 5, may extend.

It should be apparent that the lid 18 can be positioned to protect the mix in the bowl from contamination outside the bowl, as well as keeping the bowl clean and dust free during storage between uses thereof, thereby obviating the need for any other type of cover. The lid, being transparent, permits inspection of the mixing operation at all times, and it also prevents splattering of the product from the bowl during mixing.

It will be appreciated that the primary purpose of a household food mixer is to provide a beater assembly to give a blending action which will combine the ingredients in the bowl as thoroughly as desired. The design of the mixer must assure that all of the ingredients are uniformly worked upon and that there is no space where ingredients can collect and remain static and unmixed by the beater assembly. The design should also assure that the mixing process is accomplished easily and efficiently; that there is no need for scraping the bowl sides by the operator; and that no rearrangement of the ingredients is required by the operator to assure uniform mixing.

The foregoing design requirements are fulfilled by the present invention through use of beater assembly 22, shown in FIGS. 1 and 2, comprising a generally C-shaped beater frame 120 supported along its mid-portion 120a generally parallel to and adjacent the center post 24 so that its arms 120b and 120c are horizontally oriented and extend radially outwardly away from adjacent the center post. Beater frame 120 is coupled to the center post by an upper bracket 122 and a lower bracket 124, fastened to the frame along its mid-portion as by brazing the brackets having openings which receive and engage portions of center post 24, as shown in FIGS. 8 and 9. Lower bracket 122 preferably has its opening in the form of a twelve-pointed star with alternate points mating with corners of hexagonal-shaped lower portion 130 of center post 24. The twelve-pointed star-shaped opening of lower bracket 124 easily fits into engagement with the lower hexagonal portion of the center post with no more than a slight rotation of the relative parts. The interlocking of the bracket 124 and center post assures rotation of the beater frame with the rotatable center post. Upper bracket 122 has a circular opening of a size to closely encircle the circular upper portion of the center post.

As shown in FIGS. 1, 2 and 5, between the horizontal radially outwardly extending arms 120b and 120c of the C-shaped beater frame, the beater blade assembly 100 is supported with its axis vertical and parallel to center post 24. The beater blade assembly 100 comprises a pair of mutually perpendicular beater blades 130 and 132 each of a strip or ribbon material formed into a bowl-conforming inverted trapezoidal shape symmetrical about their common vertical axis. Coaxial with the blades and fixed to their bottom to rotate therewith and drive them in axial rotation is pinion gear 140, preferably formed of a molded resinous material, being part of the beater assembly. Attached to the lower end 120c of the beater frame is an extension arm 138 which extends outwardly in line with and from the bottom of the lower end of the beater frame. Arm 138 provides a bearing for pinion gear 140 which is fixed to the beater blades by rivet 136. Arm 138 is arranged to provide small clearance from the bottom of the bowl and to allow pinion gear 140 to rotate closely adjacent the bottom of bowl 14. The beater assembly 100 is rotatable as a unit relative to the beater frame 120. Rotation of the pinion gear and hence the beater relative to the beater frame is accomplished by meshing the pinion gear with a stationary gear integral with the bottom of the mixing bowl, as will now be explained.

In accordance with the present invention, the mixing bowl is preferably formed of a molded resinous material and, as can be seen in FIGS. 1, 2 and 5, has a bottom 14a which terminates in upwardly extending sidewalls 14b. A horizontally oriented ring gear 150 is formed as an integral part of the bottom of the bowl as a generally vertical discontinuity in the horizontal bottom in radial position to mesh with the pinion gear 140 of the beater assembly 100. Rotation of the pinion gear is accomplished by the meshing of its teeth with the teeth of the ring gear 150. As the beater frame 120 and assembly 100 are driven around the bowl axis by rotation of the center post 24, the pinion gear 140 walks around the ring gear 150. This action produces rotation of the beater assembly about its own axis as well as its revolution about the center post on frame 120. As the center post and beater frame are rotated in a counterclockwise direction, the meshing of pinion gear 140 with ring gear 150 causes the pinion gear to be driven in a clockwise direction so that the beater blades mechanically connected thereto on the same axis will rotate in a clockwise direction. In the preferred form of practicing the invention, direct coupling of the beaters to the ring gear by way of the pinion gear, as shown in FIGS. 1 and 2, is employed and enables speeds of rotation of the beaters relative to the speed of rotation of the beater frame which are appropriate and efficient for all mixing operations. However, it must be appreciated that other gearing, such as a gear train, either fixed in ratio or adjustable, could be employed to enable a variety of relative speeds of rotation of the beater blades responsive to one rotation of the center post. In one instance in accordance with the preferred form of the invention, by way of illustration, one revolution of the beater frame about the center post of the bowl may be made to produce approximately 5⅔ revolutions of the beater blades about their own vertical axis of revolution.

In accordance with a further feature of the preferred embodiment of the invention, the mixer is capable of performing two types of mixing action on ingredients in the bowl. This is accomplished through the latch means 26 coupling the beater frame and beater blade assembly in alternative positions with respect to the center post. The latch means when engaged couples the beater frame to the center post, as shown in FIG. 1, wherein the pinion gear meshes with the ring gear to rotate the beater blades about their own axis of rotation. Alternatively when the latch is not engaged, the pinion gear rotates with the beater frame free of the ring gear as shown in FIG. 5. The latch, therefore, provides two different mixing actions, a thorough beating action and a gentle stirring or folding action.

More specifically, as can be seen in FIGS. 1 and 5, the latch means comprises a vertically oriented bar 154 providing a member generally parallel to the center post and fixed to the beater frame. Bar 154 in the embodiment shown extends through slots 156 and 158 in brackets 122 and 124, respectively, and is positioned with respect to the beater frame by leaf spring 160, which may have its upper end riveted to bar 154. The lower end of the leaf spring is reduced in cross section where it passes through slot 156, as shown in FIG. 8, to bear against the C-shaped beater frame. Slot 156 in bracket 122, through which bar 154 passes, is enlarged in the direction to permit movement of the bar away from the center post and against the bias of the leaf spring to release the latch means. Slot 158 in bracket 124, through which bar 154 passes, is large enough to permit bar 154 to be slidably pivoted thereabout. The relative relationship of the brackets 122 and 124 to the beater frame, the openings in the brackets for the center post and bar 154 is shown in FIGS. 8 and 9 and the relationship of bar 154, leaf spring 160 and the beater frame is shown in FIGS. 1 and 5. The leaf spring 160 is interposed between bar 154 and C-shaped beater frame 120 to bias the bar in slot 156 toward latch engagement portion shown in FIGS. 1, 5 and 8.

The bar 154 extends above upper bracket 122 and the center post, as shown in FIGS. 1 and 5, have a knob 161 of resinous material attached to its upper end. Knob 161 has a bore 168 positioned to be above the center post with an enlarged diameter 166 at its opening defined by a radial shoulder. A washer 170 is press fitted within enlarged diameter 166 against the radial shoulder to retain a plunger 174 having an enlarged crosshead within the bore and a helical compression spring 175 between the crosshead and the bottom of the bore 168, thereby urging the plunger outward to the position shown in FIG. 5. The orientation of the plunger is such that when the end of plunger 174 rests atop the rounded dome top 24a of center post 24, bracket 122 encircles the center post 24 and bracket 124 engages the center post to be rotatably driven thereby. An L-shaped keeper 178 is attached to bar 154 beneath knob 161 to extend horizontally a sufficient distance to engage a circumferential annular groove 180 in the center post 24, as seen in FIG. 1. In the FIG. 1 position, the groove 180 serves as a latch to hold keeper 178 so that the beater frame assumes a vertical level with respect to the center post such that pinion 140 meshes with ring gear 150, as shown in FIG. 1.

When the beater frame and connected blade assembly are initially positioned within the bowl with appropriate openings in brackets 122 and 124 over the center post so that the star-shaped opening 128 of bracket 124 engages the hexagonal portion 130 of the center post, the plunger 174 or the keeper 178 or both rest atop the rounded top 24a of the center post to hold the beater frame assembly a sufficient distance above the bottom 14a of the bowl so that the pinion gear 140 is out of engagement with ring gear 150, as shown in FIG. 5. In this arrangement, as the center post is rotated by the motor in the base, the beater blades will revolve about the center post but will not be rotated by the pinion gear and will, therefore, only be pulled through any ingredients in the bowl for a gentle stirring action of the ingredients. This condition of the beater frame and blade assembly produces the gentle mixing action referred to above.

In order to obtain more violent beating of the ingredients in the bowl due to superimposed rotation of the blades about their own axis, knob 161 is manually depressed until the keeper 178 engages the annular latch groove 180 at which point by design the pinion is engaged with the ring gear. In the course of this downward movement keeper 178 is cammed radially outward as it slides over the increasing diameter of rounded top 24a of the center post, causing bar 154 to move outwardly against the opposition of leaf spring 160. As knob 161 is depressed, plunger 174 is driven into bore 168 compressing spring 172. When the keeper finds the groove, spring 160 urges the keeper into the groove moving the bar to the position of FIG. 1 to release the pressure. Once thus engaged, the latch groove will hold the keeper and hence the beater frame and beater blades fixed with respect to the center post in a position such that pinion gear 140 will be in engagement with ring gear 150 of the mixing bowl, as shown in FIG. 1.

It should be noted that the spacing of the teeth of the pinion gear and ring gear is such that upon depressing of the knob 161, the ring gear and pinion gear will generally be movable into their meshing condition. Moreover, the individual teeth may be beveled to effect a camming action into proper position for meshing engagement. However, should the teeth of the pinion gear abut against the teeth of the ring gear and prevent meshing, slight rotation of the center post will readily move the pinion gear to a position whereby downward movement thereof will not be retarded by abutment against the ring gear.

In order to release the latch means, disengage the pinion and ring gears and raise the beater frame assembly free of its fixed position relative to the center post, knob 161 is manually moved away from the center post toward the beater frame against the resilience of spring 160 to move keeper 178 free of latch groove 180 in the center post. When the keeper clears the groove, the urging of spring 175 will cause plunger 174 to raise the beater frame and blade assembly. Even if the knob is prematurely released, upward movement of the beater frame is aided by leaf spring 160 urging the keeper upward over the decreasing diameter rounded top 24a of the center post. By this arrangement, the beater frame will be moved to the position of FIG. 5 where the plunger is extended to its abutment against washer 170 and bar 154 is against the side of slot 156 adjacent the center post with the pinion gear definitely held out of engagement with the ring gear, as shown in FIG. 5. From the FIG. 5 position, the beater frame and blade assembly may easily be lifted upwardly from center post for cleaning of the bowl and/or removing of ingredients therefrom.

It will be observed that the beater frame and blade assembly are of such a shape and positioned in the bowl to assure that all of the ingredients in the bowl are worked upon and that there are no regions wherein ingredients are neither moved nor mixed. In addition, the beater frame includes a latching means that permits the frame and blade assembly to be easily locked down in the position for thorough mixing, where the beater blades are rotated about their own axes as well as revolving about the center post. In this position of the beater frame with the pinion gear meshing with the ring gear to rotate beater blades, all areas of the bowl are agitated by the beater assembly. More particularly, the beater blades rotate closely adjacent the sidewalls 14b of the bowl and the center post, as well as move closely adjacent the bottom 14a of the bowl through the movement of the pinion gear and supporting beater frame. Further, when a small amount of ingredients is in the bottom of the bowl, it is mixed by the lower portion of the C-shaped beater frame, the extension 138 and the rotating pinion gear meshing with the ring gear in the bottom of the bowl imparting a mixing action. The gears 140 and 150 are self-lubricating in that any ingredient in the bowl, either powder or liquid, provides lubrication between the gears, thereby avoiding any need for a sealed housing and lubrication of the gears. The location of the rotatable beater frame and gearing in the bottom of the bowl allows mixing of extremely small quantities, such as a single egg.

With the beater assembly supported within the bowl by the center post and the driving means for the beater assembly located beneath the bowl, removal of the lid 18 from the bowl leaves the entire upper portion thereof open for adding of ingredients or removal thereof from the bowl so that there is no interference with pouring ingredients into or out of the bowl by the beaters or driving means. Also, the bowl with the beater assembly contained therein can be lifted from the base and moved to other desired locations without having to separate or remove the beater assembly from the bowl causing dripping of ingredients or requiring the user to handle the beater blades with the mixed ingredients adhering thereto. Further, with the beater assembly held in the bowl by the latch means, the bowl can be removed from the base and upended to empty the contents from the bowl, as when making pancakes or the like, and the bowl can again be set on the base for further mixing of a portion of the ingredients remaining in the bowl or additional ingredients can be added and mixed without necessitating removal and replacement of the beater blades.

It will be observed that the combination of rotation and revolution of the beater blades in rotating about their own vertical axis and being revolved about the vertically oriented center post enables mixing speeds and conditions of the blades relative to the product being mixed quite differently from conventional food mixers. To give illustration of the relative speeds of the beater blades in one embodiment of the invention wherein the distance from the center post to the ring gear was 2¾ inches, the rotational speed of the center post may conveniently be 150 revolutions per minute causing the beater blades to be rotated by the pinion gear at a speed of 800 revolutions per minute. Considering only the speed of the beater blades relative to the ingredient or product in the bowl, the rotational speed of a beater blade adjacent the sidewall of the bowl is approximately 3,740 inches per minute through the product, the speed of that blade being the difference between the rotational speed of the beater blades about their own axis of revolution minus the revolving speed of the beater frame, since the beater frame is moving in one direction at that point and the particular beater blade adjacent the sidewall is moving in the opposite direction. The relative speed of a beater blade relative to the product at a position closest to the center post is approximately 7,990 inches per minute through the end product, since its speed relative to the product is the sum of the rotational speed of the blade about its own axis of revolution plus the revolving speed of the beater frame which is moving in the same direction at that time.

When the pinion gear is disengaged from the ring gear and the beater blades are revolving with the center post but not rotating about their own axis of revolution, a beater blade adjacent the sidewall is moved by the beater frame at a speed of 3,480 inches per minute through the product, and a beater blade closest to the center post is moved through the product at a speed of approximately 770 inches per minute, the difference in speeds being due to the different blades' relative distances from driving center post.

The present invention permits an arrangement of parts, including the shape of the beater blades, bowl and beater frame, to assure that all product contained in the bowl is contacted for mixing. The beater assembly moves both closely adjacent the bowl and closely adjacent the center post so that all of the product in the bowl is sheared, mixed and moved by the assembly at differing speeds for an intensive mixing action. In addition, the rotation of the center post and associated assembly is accomplished advantageously by the driving motor located beneath the bowl and the present mixer provides the fast beating action of the blades from a center post being rotated at a comparatively slow speed. Also, the beater blades in the present instance when rotated by the pinion gear move at a slower speed adjacent the sidewalls of the bowl than near the center of the bowl, thereby reducing the tendency to throw product out of the bowl at the sidewalls thereof; and at the same time with the blades rotating faster near the center of the bowl, the product is moved outwardly from the center to provide a more complete and thorough mixing thereof.

In employing a single beater blade assembly in the bowl performing the mixing, maximum safety is provided by avoiding entrapment of fingers or utensils in a scissor action between multiple beater blade assemblies rotating in opposite directions about different axes. In the present mixer when foreign objects, such as fingers or utensils, are placed in the bowl by the user and struck by the blades, the objects are generally moved outwardly by the blades free of being trapped in a scissor action thereby.

It should be appreciated that the one-piece bowl unit comprising the bowl, ring gear, rotatable center post and coupling member 88, just as the one-piece beater frame, beater blades, pinion and latch means, may be easily washed and cleaned and that there are no inaccessible spaces in which product may escape cleaning and solidify. The bowl and beater assembly may be simply taken apart for thorough cleaning and easily reassembled for further use. The spacing of the teeth of the ring gear and the pinion gear are such as to allow easy removal of any product therebetween by a cloth, brush, or agitation of water.

Also, the present mixer is capable of all types of mixing of ingredients which may be required, such as dry mixing, wet mixing, or blending and beating of liquid and powder.

It will be appreciated by those skilled in the art that the present invention provides a superior mixing action over mixers of the prior art. The mixer of the present invention is easily and quickly adjustable between two types of mixing action and is capable of mixing small quantities in the bottom of the mixing bowl. Further, the present mixer requires no hand work by the user during the mixing operation, such as hand blending and scraping the sidewall of the bowl to assure thorough mixing or supporting and turning of the bowl to assure mixing action. The present invention employing an open-top bowl enables the use of a lid during the mixing operation to keep the bowl free of foreign particles in the atmosphere and assures mixing without splattering outside the bowl. In addition, the lid allows dust-free storage of the bowl and beater assembly enabling storage thereof without requiring rewashing before using. As a further advantage, the bowl employing the beater assembly driven from beneath the bowl enables the free addition of ingredients over the entire area of the top of the bowl. Still a further feature is provided by the latch means to hold the beater assembly in the bowl to allow removal of the bowl from its base and to allow a bowl to be upended for removal of product without requiring removal of the beater assembly prior thereto.

While the present invention has been described with particular reference to a specific embodiment thereof, it will be understood that it may be embodied in a large variety of forms different from the one specifically shown and described without departing from the scope and spirit of the invention as defined by the appended claims.

We claim:

1. A mixing bowl for use with beater means to mix food ingredients therein comprising: a structure having a bottom joined to upwardly extending sidewalls defining a container for receipt of ingredients, and actuator means within and fixed to said container adjacent said bottom of said container and adjacent said sidewalls and being engageable with said beater means to cause a predetermined pattern of movement of said beater means, said actuator means and beater means being adapted to cause mixing of ingredients therebetween.

2. A mixing bowl for use with beater means to mix food ingredients therein comprising: an integral structure formed throughout of the same material and having a bottom joined to upwardly extending sidewalls defining a container for receipt of ingredients, and actuator means within and integral with said container adjacent said bottom of said container and being engageable with said beater means to cause a predetermined pattern of movement of said beater means, said actuator means and beater means being adapted to cause mixing of ingredients therebetween.

3. A mixing bowl for use in mixing food ingredients comprising: a structure having a bottom joined to upwardly extending sidewalls having a vertical axis of symmetry and defining a container for receipt of ingredients, beater means having beater blades for mixing ingredients, and actuator means within and fixed to said container adjacent said bottom of said container and being engageable with said beater means to cause said beater means to rotate said beater blades about a generally vertical axis off-center of the axis of the container in a predetermined pattern of movement in said container, said actuator means and beater means being arranged to cause mixing of ingredients therebetween.

4. A mixing bowl for use with beater means to mix food ingredients therein comprising: a structure having a bottom joined to upwardly extending sidewalls defining a container for reception of ingredients, and gear means within and fixed to said container adjacent said bottom of said container and adjacent said sidewalls and being engageable with said beater means to cause a predetermined pattern of movement of said beater means, said gear means and beater means being adapted to cause mixing of ingredients therebetween.

5. A mixing bowl for use with beater means to mix food ingredients therein comprising: an integral structure formed throughout of the same material and having a bottom joined to upwardly extending sidewalls defining a container for reception of ingredients, and gear means within and integral with said bottom of said container and being engageable with said beater means to cause a predetermined pattern of movement of said beater means, said gear means and beater means being adapted to cause mixing of ingredients therebetween.

6. A mixing bowl for use in mixing food ingredients comprising: a structure having a bottom joined to upwardly extending sidewalls having a vertical axis of symmetry and defining a container for receipt of ingredients, beater means having beater blades for mixing ingredients, and gear means within and fixed to said container adjacent said bottom of said container and being engageable with said beater means to cause said beater means to rotate said beater blades about a generally vertical axis off-center of the axis of the container in a predetermined pattern of movement in said container, said actuator means and beater means being arranged to cause mixing of ingredients therebetween.

7. A mixing bowl for use in mixing food ingredients comprising: a structure having a bottom joined to upwardly extending sidewalls having a vertical axis of symmetry and defining a container for receipt of ingredients, beater means having beater blades and gear means to cause rotation of the beater blades for mixing ingredients, and actuator means within and fixed to said container adajcent said bottom of said container and being engageable with said gear means of said beater means to cause said beater means to rotate said gear means about a generally vertical axis off-center of the axis of the container in a predetermined pattern of movement in said container, said actuator means and beater means being arranged to cause mixing of ingredients therebetween.

8. A mixing bowl for use with beater means to mix food ingredients therein comprising: a structure generally symmetrical about a central axis having a bottom joined to upwardly extending sidewalls defining a container for reception of ingredients, and a ring gear within and co-axial with said container adjacent said bottom of said container and being engageable with said beater means to cause a predetermined pattern of movement of said beater means, said ring gear and beater means being adapted to cause mixing of ingredients therebetween.

9. A mixer for use in mixing food ingredients comprising: a structure having a bottom joined to upwardly extending sidewalls defining a container for receipt of ingredients, actuator means within and fixed to said container adjacent said bottom of said container and adjacent said sidewalls, beater means within the container and having means engageable with said actuator means to cause a predetermined pattern of movement of the beater means, and means coupling the beater means and the container and holding said beater means within said container in proper position to cooperate with said actuator means, said actuator means and beater means being cooperable to cause mixing of ingredients therebetween.

10. A mixer for use in mixing food ingredients comprising: an integral structure formed throughout of the same material and having a bottom joined to upwardly extending sidewalls defining a container for receipt of ingredients, actuator means within and integral with said container adjacent said bottom of said container, beater means within the container and having means engageable with said actuator means to cause a pattern of movement of the beater means, and means coupling the beater means and the container and holding said beater means within said container in proper position to cooperate with said actuator means, said actuator means and beater means being cooperable to cause mixing of ingredients therebetween.

11. A mixer for use in mixing food ingredients comprising: a structure having a bottom joined to upwardly extending sidewalls having a vertical axis of symmetry and defining a container for receipt of ingredients, actuator means within and fixed to said container adjacent said bottom of said container, beater means having beater blades rotatable about a generally vertical axis off-center of the axis of the container and having means engageable with said actuator means to cause said beater means to rotate said beater blades about said generally vertical axis in a pattern of movement in said container, and means coupling the beater means and the container and holding said beater means within said container in proper position to cooperate with said actuator means, said actuator means and beater means being cooperable to cause mixing of ingredients therebetween.

12. A mixer for use in mixing food ingredients comprising: a structure having a bottom joined to upwardly extending sidewalls having a vertical axis of symmetry and defining a container for receipt of ingredients, actuator means within and fixed to said container adjacent said bottom of said container, beater means having beater blades and gear means rotatable about a generally vertical axis off-center of the axis of the container, said gear means being engageable with said actuator means to cause said beater means to rotate said beater blades in a pattern of movement in said container, and means coupling the beater means and the container and holding said beater means within said container in proper position to cooperate with said actuator means, said actuator means and beater means being cooperable to cause mixing of ingredients therebetween.

13. A mixer for mixing food ingredients comprising: a structure having a bottom joined to upwardly extending sidewalls defining a container for reception of ingredients, a ring gear within and fixed to said container adjacent said bottom of said container, beater means including gear means engageable with said ring gear and mounted on said beater means for causing rotation of said beater means, and means supporting the beater means relative to the bowl, said ring gear and gear means being cooperable to cause mixing of ingredients therebetween.

14. A mixer for mixing food ingredients comprising: a bowl generally symmetrical about a central axis having a bottom joined to upwardly extending sidewalls defining a container for reception of ingredients, a ring gear within, coaxial with and fixed to said container adjacent said bottom of said container, and beater means including a pinion gear engaged with said ring gear and fixed to said beater means for causing rotation of said beater means about the axis of pinion gear rotation, and means supporting the beater means relative to the bowl and supplying force to revolve the beater about the bowl axis, said ring gear and pinion gear being cooperable to cause mixing of ingredients therebetween.

15. A mixer for use in mixing food ingredients comprising: a bowl for reception of ingredients and having a bottom joined to upwardly extending sidewalls, a center post rotatably supported in said bowl, beater means coupled to said center post and adapted to be driven by said center post in a planetary manner about its axis, and actuator means within and fixed to said bottom of said bowl adjacent said sidewalls and being engageable with said beater means to cause a predetermined pattern of movement of said beater means, said actuator means and beater means being cooperable to cause mixing of ingredients therebetween.

16. A mixer for use in mixing food ingredients comprising: a bowl for reception of ingredients and having a bottom joined to upwardly extending sidewalls, a center post rotatably supported in said bowl, beater means having beater blades coupled to said center post and adapted to be driven by said center post in a planetary manner about its axis, and actuator means within and fixed to said bottom of said bowl and being engageable with said beater means to cause said beater means to rotate said beater blades about a generally vertical axis off-center of the axis of said center post in a pattern of movement of said beater means, said actuator means and beater means being cooperable to cause mixing of ingredients therebetween.

17. A mixer for use in mixing food ingredients comprising: a bowl for reception of ingredients and having a bottom joined to upwardly extending sidewalls, a center post rotatably supported in said bowl, beater means coupled to said center post and adapted to be driven by said center post in a planetary manner about its axis, and actuator means within and integral with said bottom of said bowl and being engageable with said beater means to cause a predetermined pattern of movement of said beater means, said actuator means and beater means being cooperable to cause mixing of ingredients therebetween.

18. A mixer for use in mixing food ingredients comprising: a bowl for reception of ingredients and having a bottom joined to upwardly extending sidewalls, a center post rotatably supported in said bowl, beater means having beater blades and gear means coupled to said center post and adapted to be driven by said center post in a planetary manner about its axis, said gear means being rotatable about a generally vertical axis off-center of the axis of the center post, and actuator means within and fixed to said bottom of said bowl and being engageable with said gear means to cause said beater means to rotate said beater blades in a pattern of movement of said beater means, said actuator means and beater means being cooperable to cause mixing of ingredients therebetween.

19. A mixer for use in mixing food ingredients comprising: a bowl for reception of ingredients and having a bottom joined to upwardly extending sidewalls, a center post within said bowl rotatably supported in and extending beneath the bottom of said bowl, a coupling member fixed to said center post beneath said bottom to connect said center post to rotation producing drive means, beater means coupled to said center post and adapted to be driven by said center post in a planetary manner about its axis, and actuator means within and fixed to said bowl adjacent said bottom of said bowl and engageable with said beater means to cause a predetermined pattern of movement of said beater means superimposed on said planetary motion, said actuator means and beater means being cooperable to cause mixing of ingredients therebetween.

20. A mixer for use in mixing food ingredients comprising: a bowl generally symmetrical about a central axis for reception of ingredients and having a bottom joined to upwardly extending sidewalls, a center post within said bowl, coaxial with the bowl axis, and rotatably supported in the bottom of said bowl, a ring gear within, coaxial with and fixed to said bowl adjacent said bottom thereof, a beater frame coupled to said center post to be revolved thereabout, beater blade means rotatably supported by said beater frame, conforming to the space between said center post and said sidewalls and adapted to be revolved with said beater frame in a planetary manner around said center post, a pinion gear fixed to said beater blade means adjacent the bottom thereof and selectively engageable with said ring gear for rotating said beater blade means about its own axis of revolution, said pinion gear meshing with said ring gear to superimpose rotation of said beater blade means upon revolution thereof about the center post, said pinion gear and ring gear being cooperable to cause meshing of ingredients therebetween.

21. A mixer for use in mixing food ingredients comprising: a bowl for reception of ingredients and having a bottom joined to upwardly extending sidewalls, a center post rotatably supported in said bowl, a first gear within and fixed to said bowl adjacent said bottom thereof, a beater frame adapted to be coupled to said center post to rotate therewith and having a first position of being coupled to said center post and a second position of being coupled to said center post, beater blade means rotatably supported by said beater frame and conforming to the space between said center post and said sidewalls and adapted to be driven in a planetary manner around said center post, a pinion gear fixed to said beater blade means and engageable with said first gear for driving said beater blade means about its axis of revolution between said center post and said sidewalls, said pinion gear being movable free of said first gear in said first position of said beater frame and said pinion gear meshing with said first gear in said second position of said beater frame, said first gear and said pinion gear in said second position being cooperable to cause mixing of ingredients therebetween.

22. A mixer for use in mixing food ingredients comprising: a bowl for reception of ingredients and having a bottom joined to upwardly extending sidewalls, a center post within said bowl rotatably supported in said bottom of said bowl, a first gear within and fixed to said bowl adjacent said bottom thereof, a beater frame removably coupled to said center post to revolve thereabout as the post is rotated, beater blade means rotatably supported by said beater frame between said center post and sidewalls and conforming to the space between said center post and said sidewalls, and a pinion gear fixed coaxially to said beater blade means and engageable with said first gear to cause rotation of said beater blade means about the axis of pinion gear rotation, said first gear and pinion gear being cooperable to cause mixing of ingredients therebetween.

23. The mixer of claim 22 in which said sidewalls of said bowl terminate in a lip above said center post, said mixer further comprising a removable lid adapted to engage said lip to serve as a closure for said bowl, said lid allowing movement of said beater frame and beater blade means during the mixing operation.

24. A mixer for use in mixing food ingredients comprising: a bowl for reception of ingredients and having a bottom joined to upwardly extending sidewalls, a center post within the bowl rotatably supported in and extending through said bottom of said bowl and provided with coupling means below the bowl enabling said center post to be driven from outside said bottom of said bowl, a first gear within and fixed to said bowl adjacent said bottom thereof, a beater frame releasably coupled to said center post thereby to be driven in revolution thereabout, beater blade means rotatably supported by said beater frame between said center post and said sidewalls, a pinion gear fixed to said beater blades means and engageable with said first gear to cause rotation of said beater means about the axis of pinion rotation, and releasable latch means between said beater frame and the center post to hold said beater frame relative to said center post in one of two positions, in the first position of which said pinion gear does not engage said first gear and in the second position of which said pinion gear engages said first gear to rotate said beater blade means about the axis of pinion gear rotation, thereby superimposing rotation upon revolution and providing two different mixing actions in said bowl.

25. The mixer of claim 24 in which the beater frame is coupled to the center post by interfitting portions which prevent relative rotation but permit relative axial movement thereof and in which means is provided between the center post and the beater frame to resiliently urge the beater frame upward relative to the center post against gravity into the first position and the latch means is engageable when the frame is pressed downward against the resilient means to the second position.

26. The mixer of claim 25 in which the latch means consists of a member supported on the beater frame and movable relative thereto resiliently urged toward the center post and means on the center post, said member and said means respectively providing shoulders which, when engaged, oppose relative axial movement of the beater frame and center post in the direction from the second position toward the first position.

27. The mixer of claim 26 in which the latch means consists of a groove in the center post and a keeper supported on the beater frame and resiliently urged toward the center post.

28. The mixer of claim 26 in which the member resiliently urged toward the center post is an elongated element generally parallel to the center post laterally movable relative to the beater frame against such resilient urging by means of a knob connected to the top end of said elongated member and arranged to overlie the top of said center post and in which said knob also retains the means which resiliently urges the beater frame upward relative to the center post.

29. A food mixer comprising: a support base, drive means supported in said base, a driving coupling member coupled to the drive means and accessible through an opening in said base, a bowl for receipt of ingredients to be mixed and having a bottom joined to upwardly extending sidewalls, said support base having seating means for supporting said bowl and said bowl having mating seating means adapted to cooperate with said seating means of said base to hold said bowl against rotation relative to said support base coaxial with said driving coupling member, a center post within said bowl rotatably supported in said bottom of said bowl and extending beneath said bowl, driven coupling member fixed to said center post beneath said bowl for cooperation with said driving coupling member to impart rotation to said center post, and beater means coupled to said center post within said bowl and driven in a planetary manner by said center post about its axis.

30. A food mixer for use with beater means to mix food ingredients comprising: a support base having a top and bottom and having a collar portion in said top, said support base having drive means located therein and a driving coupling member coupled to the drive means accessible through an opening in said top of said base, and a bowl for receipt of ingredients to be mixed and having a bottom joined to upwardly extending sidewalls, a rotatable center post within the bowl rotatably fixed in the bottom of said bowl and extending below the bottom of said bowl, said center post terminating in a driven coupling member for cooperation with said driving coupling member, said bowl having a collar portion extending downwardly from said bottom thereof adapted to cooperate with said collar portion of said base to hold said bowl against axial rotation relative to said base, beater means coupled to said center post and driven in a planetary manner by said center post, said coupling members being inter-connectable to rotate said center post in order to revolve said beater means within said bowl.

31. A food mixer for use with beater means to mix food ingredients comprising: a support base having a top and bottom and having a collar portion on said top and a bowl having a bottom joined to upwardly extending sidewalls for receipt of ingredients to be mixed, said bowl having a downwardly extending collar portion from said bottom thereof adapted to cooperate with said collar portion of said base, said collar portion of said bowl being non-circular in form and said collar portion of said base having a mating non-circular form to prevent rotation of said bowl about a vertical axis relative to said base, said collar portion of said base and said collar portion of said bowl having respectively cooperating means for providing interlocking engagement between said bowl and said base to hold said bowl on said base.

32. The mixer of claim 31 in which said means for providing inter-locking engagement between said bowl and said base comprises at least one projection on one collar portion adapted to be retained by at least one groove in the other collar portion, and drive means in the base adapted to be coupled to beater means in the bowl which beater means tend to rotate the bowl in such direction as to engage said at least one projection in said at least one groove.

33. A food mixer comprising: a support base having drive means supported therein and having a driving coupling member connected to the drive means accessible through an opening in said base, a bowl for reception of ingredients and having a bottom joined to upwardly extending sidewalls, said support base having seating means for supporting said bowl, said bowl having actuator means within and fixed to said bowl and mating seating means adapted to cooperate with said seating means of said base to hold said bowl against axial rotation relative to said base, a center post rotatably supported in said bottom of said bowl and extending through said bottom and having a driven coupling member fixed thereto beneath said bowl adapted to engage said driving coupling member for rotating said center post, beater means coupled to said center post and adapted to be driven in a planetary manner by said center post about its axis, said beater means being engageable with said actuator means to cause a predetermined pattern of movement of said beater means.

34. A food mixer comprising: a support base having a top and bottom and having drive means supported therein with a drive shaft accessible through an opening in said base, said base having a collar portion in said top thereof, a bowl for reception of ingredients and having a bottom joined to upwardly extending sidewalls, said bowl having actuator means within and fixed to said bowl and having a downwardly extending mating collar portion from said bottom thereof adapted to cooperate with said collar portion of said base to hold said bowl against axial rotation relative to said base, a center post rotatably supported in said bottom of said bowl and extending through said bottom for coupling to said drive shaft for rotating said center post, a beater frame releasably coupled to said center post to be revolved thereabout as the center post rotates, and beater means rotatably supported by said beater frame and conforming to the space between said center post and said sidewalls and driven in a planetary manner around said center post, said beater means being engageable with said actuator means to cause a rotation of said beater means relative to the beater frame.

35. A mixing bowl comprising: a support base having a top and bottom and having drive means supported therein with a drive shaft accessible through an opening in said base, said base having a collar portion in said top thereof, a bowl for reception of ingredients and having a bottom joined to upwardly extending sidewalls, said bowl having actuator means within and fixed to said bowl and having a downwardly extending mating collar portion from said bottom thereof adapted to cooperate with said collar portion of said base to prevent axial rotation of said bowl relative to said base, said collar portion of said base and said mating collar portion of said bowl having means for providing locking engagement between said bowl and said base, a center post within said bowl rotatably supported in said bottom of said bowl and extending through said bottom of said bowl, said center post being adapted to be coupled to said drive shaft for imparting rotation to said center post, a beater frame releasably coupled to said center post to rotate therewith, and beater blade means rotatably supported by said beater frame and conforming to the space between said center post and said sidewalls and driven in a planetary manner around said center post, said beater blade means being engageable with said actuator means to cause rotation of said beater blade means relative to the beater frame.

36. The food mixer of claim 35 in which said means for providing locking engagement between said bowl and said base comprises a plurality of projections on said collar portion of said bowl each adapted to be retained within a plurality of grooves in said collar portion of said base, each groove cooperable to mate with a different one of said projections, whereby slight rotation of said bowl about its axis caused by said drive means rotating said center post causes said projections to be moved into locking engagement with said grooves.

37. A food mixer comprising: a support base having a collar portion in the top thereof, drive means supported in said support base having a driving coupling member accessible through an opening within the collar portion of said support base, a bowl for reception of ingredients having a bottom joined to upwardly extending sidewalls and a first gear within and fixed adjacent to said bottom thereof, said bowl having a mating collar portion extending downwardly from said bottom thereof adapted to cooperate with said collar portion of said base to hold said bowl against axial rotation relative to said base, a center post within the bowl rotatably supported in and extending beneath said bottom of said bowl, said center post being adapted to be coupled to said driving coupling member for imparting rotation to said center post, a beater frame adapted to be coupled to said center post to be revolved thereby around said bowl, beater blade means rotatably supported by said beater frame between said center post and said sidewalls including a pinion gear positioned to be adjacent said bottom of said bowl and selectively engageable with said first gear to cause rotation of said beater blade means relative to the beater frame about an axis removed from said center post.

38. The food mixer of claim 37 in which said first gear comprises a ring gear formed within said bowl as an integral part thereof and said pinion gear causes rotation of said beater blade means about a vertical axis parallel to the center post.

39. The food mixer of claim 38 in which said sidewalls of said bowl terminate in a lip, and said mixer further comprises a removable lid adapted to engage the lip of said sidewalls of said bowl to serve as a closure for said bowl, said lid allowing movement of said beater frame and beater blade means during the mixing operation.

40. A food mixer comprising: a support base having a collar portion in said top thereof, drive means supported in said support base having a driving coupling member accessible through an opening within said collar portion, a bowl for reception of ingredients having a bottom joined to upwardly extending sidewalls, a first gear within and fixed to said bowl adjacent said bottom thereof, said bowl having a downwardly extending mating collar portion from said bottom thereof adapted to cooperate with said collar portion of said base to hold said bowl against axial rotation relative to said base, a center post within the bowl rotatably supported in and extending through said bottom of said bowl, coupling means connected to said center post adapted to be coupled to said driving coupling member for imparting rotation to said center post, a beater frame releasably coupled to said center post to be revolved thereby around said bowl, beater blade means rotatably supported by said beater frame between said center post and said sidewalls, a pinion gear rotatably fixed to said beater blade means to rotate therewith, said pinion gear being selectively engageable with said first gear to cause rotation of said beater blade means about the axis of pinion gear rotation, and a releasable latch means coupled to said beater frame to hold said beater frame relative to said center post alternatively in a first position wherein said pinion gear is disengaged and said beater blade means is revolved with said beater frame about said center post and in a second position wherein said pinion gear engages said first gear to rotate said beater blade means about the axis of pinion gear rotation in addition to revolution about the center post.

41. The food mixer of claim 40 in which said releasable latch means comprises: an elongated movable member supported by said beater frame generally parallel to the center post when said beater frame is coupled to said center post, resilient means to urge the elongated movable member toward the center post, a knob attached to said movable member at one end and overlying the center post when said beater frame is coupled to said center post, a plunger supported in the knob and resiliently biased downwardly to engage the top of said center post, a latch shoulder on the center post and a keeper supported by said movable member and adapted to releasably engage said latch shoulder to hold said beater frame fixed to said center post against the urging of said plunger in said second position so that said bowl may be upended with said beater frame fixed in said bowl, whereby movement of said movable member away from said center post will release said keeper allowing said plunger to urge said member and beater frame upwardly into the first position.

42. The food mixer of claim 41 in which the latch shoulder is provided by a groove in the sidewall of said center post and said keeper is adapted to engage said grooved sidewall of said center post in said second position of said beater frame to releasably hold said beater frame fixed in said second position.

43. A food mixer for use in mixing food ingredients comprising: a support base having a top and bottom; a bowl having a bottom joined to upwardly extending sidewalls for receipt of ingredients to be mixed; beater means within said bowl for mixing food ingredients; drive means in said base adapted to be coupled to said beater means to drive said beater means in said bowl which beater means tends to rotate said bowl; said base having seating means for supporting said bowl; and means for providing interconnection of said bowl and base members including engagement means supported by one of the members, and cooperating engagement means supported by the other of the members for being engaged upon rotation of said bowl relative to said base by said beater means to limit the rotation of said bowl and to hold said bowl on said base, whereby said bowl will be fixed to said base while said beater means is being driven by said drive means.

44. The mixer of claim 43 in which said engagement means is provided by at least one projection on said one member and said cooperating engagement means is provided by at least one portion of said other member adapted to receive said at least one projection, said beater means tending to rotate said bowl in a direction to engage said at least one projection with said at least one portion.

45. The mixer of claim 43 in which said engagement means is provided by at least one projection on said one member and said cooperating engagement means is provided by at least one groove in said other member, said beater means tending to rotate said bowl in a direction to engage said at least one projection with said at least one groove.

References Cited
UNITED STATES PATENTS

| | | | |
|---|---|---|---|
| 229,932 | 7/1880 | Witsil | 259—40 |
| 411,903 | 10/1889 | Rieseck | 259—21 |
| 1,121,107 | 12/1914 | Kress | 259—21 |
| 1,154,772 | 9/1915 | Hollstein | 259—64 |
| 2,003,829 | 6/1935 | Gilbert et al. | 259—102 |
| 3,126,196 | 3/1964 | Staeger | 259—111 |

ROBERT W. JENKINS, *Primary Examiner.*